(12) United States Patent
Oh et al.

(10) Patent No.: US 7,349,183 B2
(45) Date of Patent: Mar. 25, 2008

(54) ACTUATOR ASSEMBLY HAVING OPTIMIZED 4-BAR LINKAGE TYPE ACTUATOR ARM, HARD DISK DRIVE EMPLOYING THE SAME, AND METHOD FOR OPTIMIZING SHAPE OF OPENING FORMED IN ACTUATOR ARM

(75) Inventors: Dong-ho Oh, Seoul (KR); Yong-kyu Byun, Yongin-si (KR); Cheol-soon Kim, Anyang-si (KR); Haeng-soo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 11/264,002

(22) Filed: Nov. 2, 2005

(65) Prior Publication Data

US 2006/0092574 A1   May 4, 2006

Related U.S. Application Data

(60) Provisional application No. 60/624,200, filed on Nov. 3, 2004.

(30) Foreign Application Priority Data

Feb. 22, 2005   (KR) .................. 10-2005-0014511

(51) Int. Cl.
*G11B 5/48* (2006.01)

(52) U.S. Cl. .................................... 360/244.2
(58) Field of Classification Search ..................... None
See application file for complete search history.

(56) References Cited

U.S. PATENT DOCUMENTS

| | | | | |
|---|---|---|---|---|
| 5,526,205 | A * | 6/1996 | Aoyagi et al. ........... | 360/244.2 |
| 6,219,203 | B1 * | 4/2001 | Arya et al. .............. | 360/244.2 |
| 6,297,933 | B1 * | 10/2001 | Khan et al. .............. | 360/244.2 |
| 6,310,746 | B1 * | 10/2001 | Hawwa et al. ........... | 360/97.01 |
| 6,989,968 | B2 * | 1/2006 | Takasugi et al. ......... | 360/244.2 |

* cited by examiner

*Primary Examiner*—William Korzuch
*Assistant Examiner*—Mark Blouin
(74) *Attorney, Agent, or Firm*—Sughrue Mion, PLLC

(57) ABSTRACT

An actuator arm of an actuator assembly includes a 4-bar linkage structure defined by a trapezoidal shaped opening formed between a front end of the actuator arm and a pivot shaft. A first rounded extension portion and a second rounded extension portion are formed at two corners adjacent to the pivot shaft of the opening, respectively, and a third rounded extension portion is formed at two corners adjacent to a front end of the opening, and hinges $H_1$, $H_2$, $H_3$ and $H_4$ are formed at the actuator arm by the first, second and third extension portions. Design factors determining a shape of the opening are optimized to meet the following relations for the structure of the 4-bar linkage: $W(\cos \beta - 1) + Z(\cos \alpha - 1) = \delta_x = 0$, $W \sin \beta + Z \sin \alpha = \delta_y = 0$.

12 Claims, 12 Drawing Sheets

(3 of 12 Drawing Sheet(s) Filed in Color)

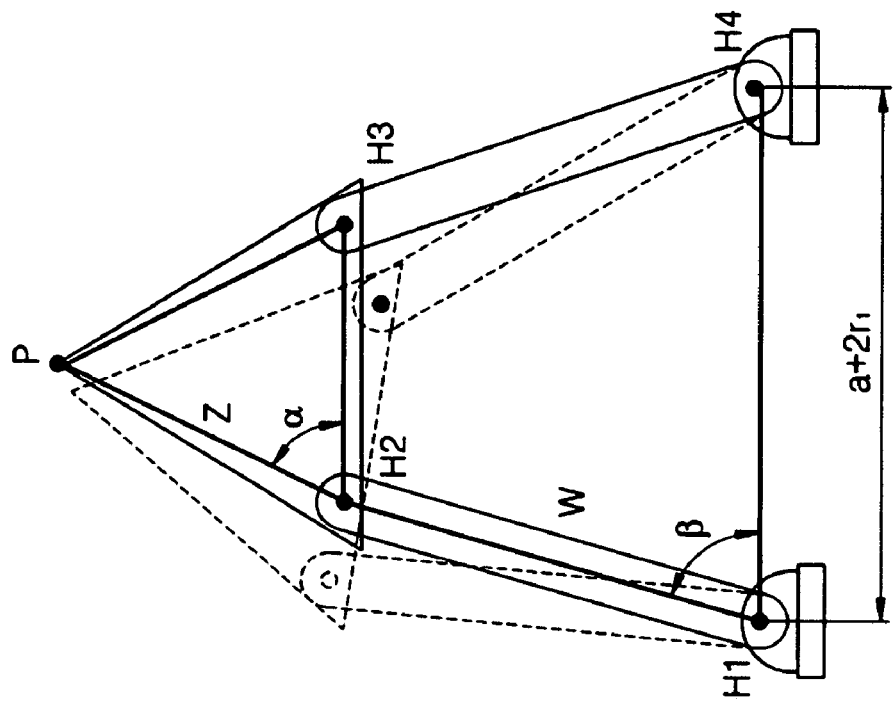
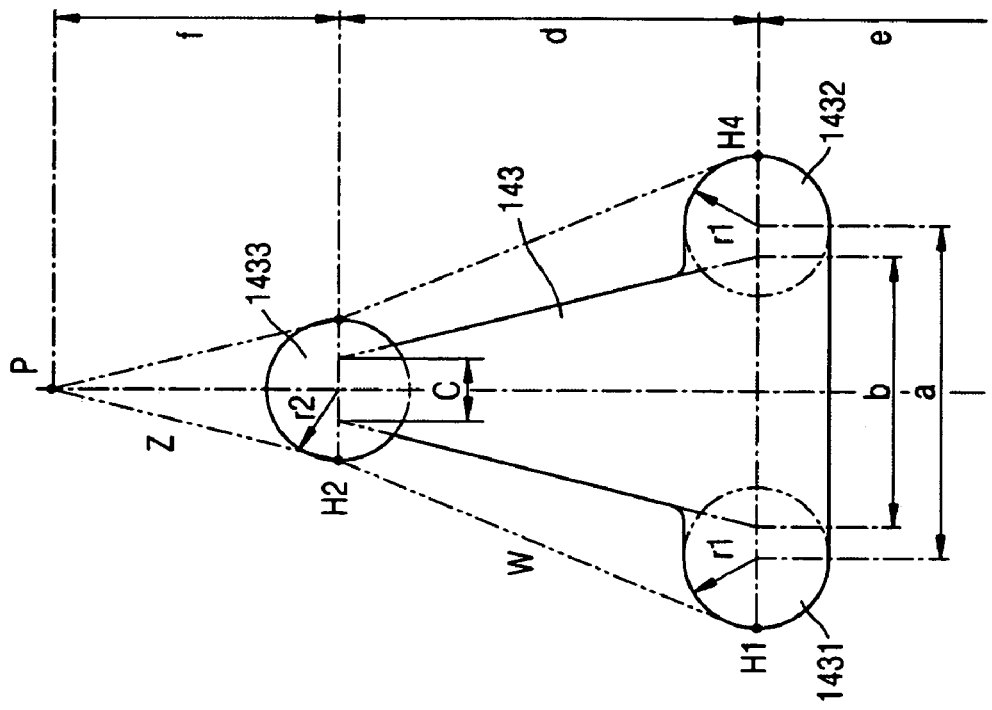

ACTUATOR ASSEMBLY HAVING OPTIMIZED 4-BAR LINKAGE TYPE ACTUATOR ARM, HARD DISK DRIVE EMPLOYING THE SAME, AND METHOD FOR OPTIMIZING SHAPE OF OPENING FORMED IN ACTUATOR ARM

CROSS-REFERENCE TO RELATED PATENT APPLICATION

This application claims the benefit of U.S. Provisional Patent Application No. 60/624,200, filed on Nov. 3, 2004, in the U.S. Patent and Trademark Office, and the benefit of Korean Patent Application No. 10-2005-0014511, filed on Feb. 22, 2005, in the Korean Intellectual Property Office, the disclosures of which are incorporated herein in their entirety by reference.

BACKGROUND OF THE INVENTION

1. Field of the Invention

The present invention relates to a hard disk drive, and more particularly, to an actuator assembly having an optimized 4-bar linkage type actuator arm.

2. Description of the Related Art

A hard disk drive is a mechanism that reads data or writes data from or on a disk by use of a magnetic head mounted on a magnetic head slider. When the hard disk drive is operating, the magnetic head slider is floating at a certain distance from the disk.

FIG. 1 is a plan view of a conventional actuator assembly for a hard disk drive.

Referring to FIG. 1, an actuator assembly 10 moves a read/write head 16 for reading and writing data to a desired position above a data storage disk (not shown). The actuator assembly 10 includes an actuator arm 12 rotatably coupled to a pivot shaft 11 installed to a base member (not shown) of the hard disk drive. A suspension 14 is fixed to a front end of the actuator arm 12 for biasing a slider 15 with the head 16 mounted thereon towards a surface of the disk. The actuator arm 12 is formed with a triangular opening 13 at a middle portion of the actuator arm 12 so as to reduce a weight thereof. A voice coil 17 is coupled to a rear end of the actuator arm 12, and a magnet 18 is disposed facing the voice coil 17. The voice coil 17 and the magnet 18 compose a voice coil motor for rotating the actuator arm 12.

The voice coil motor is controlled by a servo control system in order to rotate the actuator arm 12 in a direction corresponding to Fleming's left-hand rule, due to the interaction of magnetic field induced by the magnet 18 and current applied to the voice coil 17. Specifically, when the hard disk drive is turned on and the disk starts rotating, the voice coil motor rotates the actuator arm 12 in one direction to move the read/write head 16 toward a data recording surface of the disk. In this state, the read/write head 16 follows a desired track on the data recording surface of the disk to write or read the data. In contrast, when the hard disk drive is turned off and the disk stops rotating, the voice coil motor rotates the actuator arm 12 in a reverse direction to move the read/write head 16 off the data recording surface of the disk.

Recently, as a data recording density of the disk is increased, a width of the track becomes gradually narrow. As such, it is necessary to increase the precision of positioning control of the read/write head. The precision of the positioning control of the read/write head is influenced by a vibration generated due to rotation of the disk or a movement of the actuator arm and vibration of the actuator arm due to an external impact to the hard disk drive. Thus, a position error signal increases, which lowers reliability of the data read and write. Accordingly, in order to reduce the position error signal, it is necessary to expand a bandwidth for the position control of the read/write head and reduce the vibration of the actuator arm.

The expansion of the bandwidth is greatly influenced by a main resonance mode of the actuator arm. The main resonance mode of the actuator arm means a vibration mode produced by a bending deformation of the actuator arm, which is also referred to as "butterfly mode." Accordingly, the bandwidth may be expanded by increasing a resonance frequency of the main resonance mode of the actuator arm. Up to now, the actuator arm has been formed with the opening to reduce the weight thereof. Stiffness of the actuator arm is raised to increase the resonance frequency up to a certain extent. However, since the light weight and high stiffness of the actuator arm are reverse proportional factors to each other, it is difficult to sufficiently increase the resonance frequency. Also, the light weight and high stiffness of the actuator arm may deteriorate the impact resistance of the actuator assembly. Therefore, expanding the bandwidth for the position control of the read/write head by increasing the resonance frequency has not been performed often.

Meanwhile, the main resonance mode of the actuator arm is caused by the operation of the actuator assembly. Specifically, when a certain power signal is inputted to the voice coil to operate the actuator assembly, the read/write head is shifted as an output thereof. At this time, the position error signal increases as the displacement of the read/write head becomes larger. Accordingly, in order to decrease the position error signal, it is necessary to minimize the displacement of the read/write head.

SUMMARY OF THE INVENTION

Illustrative, non-limiting exemplary embodiments of the present invention overcome the above disadvantages, and other disadvantages not described above.

An apparatus consistent with the present invention provides an actuator assembly, in which design factors of an actuator arm having a structure of a 4-bar linkage are optimized to minimize the displacement of a read/write head and thus reduce a position error signal.

Another object of the present invention is to provide a hard disk drive employing the actuator assembly and a method for optimizing a shape of an opening formed in the actuator arm.

According to an aspect of the present invention, there is provided an actuator assembly for a hard disk drive including a slider with a read/write head mounted thereon, a suspension supporting the slider, an actuator arm rotatably coupled to a pivot shaft; in which the suspension is fixed to a front end of the actuator arm, and a voice coil motor rotating the actuator arm, wherein the actuator arm includes a structure of a 4-bar linkage defined by an opening formed between the front end of the actuator arm and the pivot shaft, wherein the opening has an approximately trapezoidal shape in which a first rounded extension portion and a second rounded extension portion are formed at two corners adjacent to the pivot shaft of the opening, respectively, and a third rounded extension portion is formed at two corners adjacent to a front end of the opening, and hinges $H_1$, $H_2$, $H_3$ and $H_4$ are formed at the actuator arm by the first, second and third extension portions; and if a position vector corresponding to linkage $H_1$-$H_2$ connecting two hinges $H_1$ and $H_2$ formed at one side of the opening is W, a position vector of the read/write head at the hinge $H_2$ is Z, an angle of the vector Z is α, an angle of the vector W is β, and a displacement of the head/write head of the actuator assembly in a main resonance mode is δ, design factors determining the shape of the opening are optimized to meet the following relations for the structure of 4-bar linkage:

$$W(\cos \beta - 1) + Z(\cos \alpha - 1) - \delta_x = 0$$

$$W \sin \beta + Z \sin \alpha = \delta_y = 0$$

The position vectors W and Z and the angles β and α corresponding to the position vectors may be obtained from the following relations for one constant and four variables among the design factors of the opening, the four variables including a distance a between each center of the first and second expansion portions, a vertical distance d between the center of the first expansion portion and a center of the third expansion portion, a radius $r_1$ of the first and second expansion portions, and a radius $r_2$ of the third expansion portion, and the constant is a vertical distance f between the center of the third expansion portion and the read/write head:

$$Z = \sqrt{r_2^2 + f^2}$$

$$\alpha = \tan^{-1}(f/r_2)$$

$$W = \sqrt{(a/2 + r_1 - r_2)^2 + d^2}.$$

$$\beta = \tan^{-1}[d/(a/2 + r_1 - r_2)]$$

According to another aspect of the present invention, there is provided a hard disk drive comprising: a base member and a cover member; a spindle motor installed to the base member; a disk mounted to the spindle motor for storing data; and an actuator assembly with the structure described above for moving a read/write head toward a desired position on the disk.

According to another aspect of the present invention, there is provided a method for optimizing a shape of an opening to be formed in an actuator arm of a hard disk drive including a structure of 4-bar linkage, the method comprising: selecting design factors significantly influencing a position error signal among the design factors determining a shape of the opening; deriving relations for position vectors W and Z and angles β and α corresponding to the position vectors using the selected design factors; and obtaining an optimum value of the design factors using the derived relations and the relations for the structure of the 4-bar linkage.

The design factor selecting operation may include: designing the design factors using factorial design (FD) of 2-level design, and obtaining data for the position error signal, and calculating a P-value indicating a significance of each design factor based on the data for the position error signal through analysis of variance (ANOVA), and selecting the design factors of high significance according to the calculated P-value.

The factorial design (FD) may be ⅛ fractional factorial design (FFD).

The selected design factors may include four variables and one constant, the variables including a distance a between each center of the first and second expansion portions, a vertical distance d between the center of the first expansion portion and a center of the third expansion portion, a radius $r_1$ of the first and second expansion portions, and a radius $r_2$ of the third expansion portion, and the constant is a vertical distance f between the center of the third expansion portion and the read/write head.

The position vectors W and Z and the angles β and α corresponding to the position vectors may be obtained from the above relations for the one constant and the four variables.

The method may further comprise secondary optimizing the design factors through a statistical method using the optimum values of the design factors as initial values.

This secondary optimization operation may include deriving equations for the position error signal and a first bending inherent vibration frequency in a main resonance mode based on the initial values of the design factors using a response surface method (RSM), and when the first bending inherent vibration frequency is set at a constant level, obtaining optimum values of the design factors to minimize the position error signal by using a response optimizer.

A Box-Behnken 3-level design is utilized in the RSM.

BRIEF DESCRIPTION OF THE DRAWINGS

The patent or application file contains at least one drawing executed in color. Copies of this patent or patent application publication with color drawings will be provided by the Office upon request and payment of the necessary fee.

The above and other features and advantages of the present invention will become more apparent by describing in detail exemplary embodiments thereof with reference to the attached drawings in which:

FIGS. 6A and 6B are views comparatively illustrating the design factors shown in FIG. 5 and a structure of a 4-bar linkage;

DETAILED DESCRIPTION OF THE INVENTION

The present invention will now be described more fully hereinafter with reference to the accompanying drawings, in which exemplary embodiments of the invention are shown. This invention may, however, be embodied in many different forms and should not be construed as being limited to the embodiments set forth herein. These embodiments are provided so that this disclosure will be thorough and complete, and will fully convey the scope of the invention to those skilled in the art. Like numbers refer to like elements throughout the specification.

Although the present invention may be applied to a hard disk drive having a diameter of 3.5 inches, which is utilized in a desk top computer, the present invention may be also applied to a hard disk drive having a diameter different from 3.5 inches.

Figure 2:
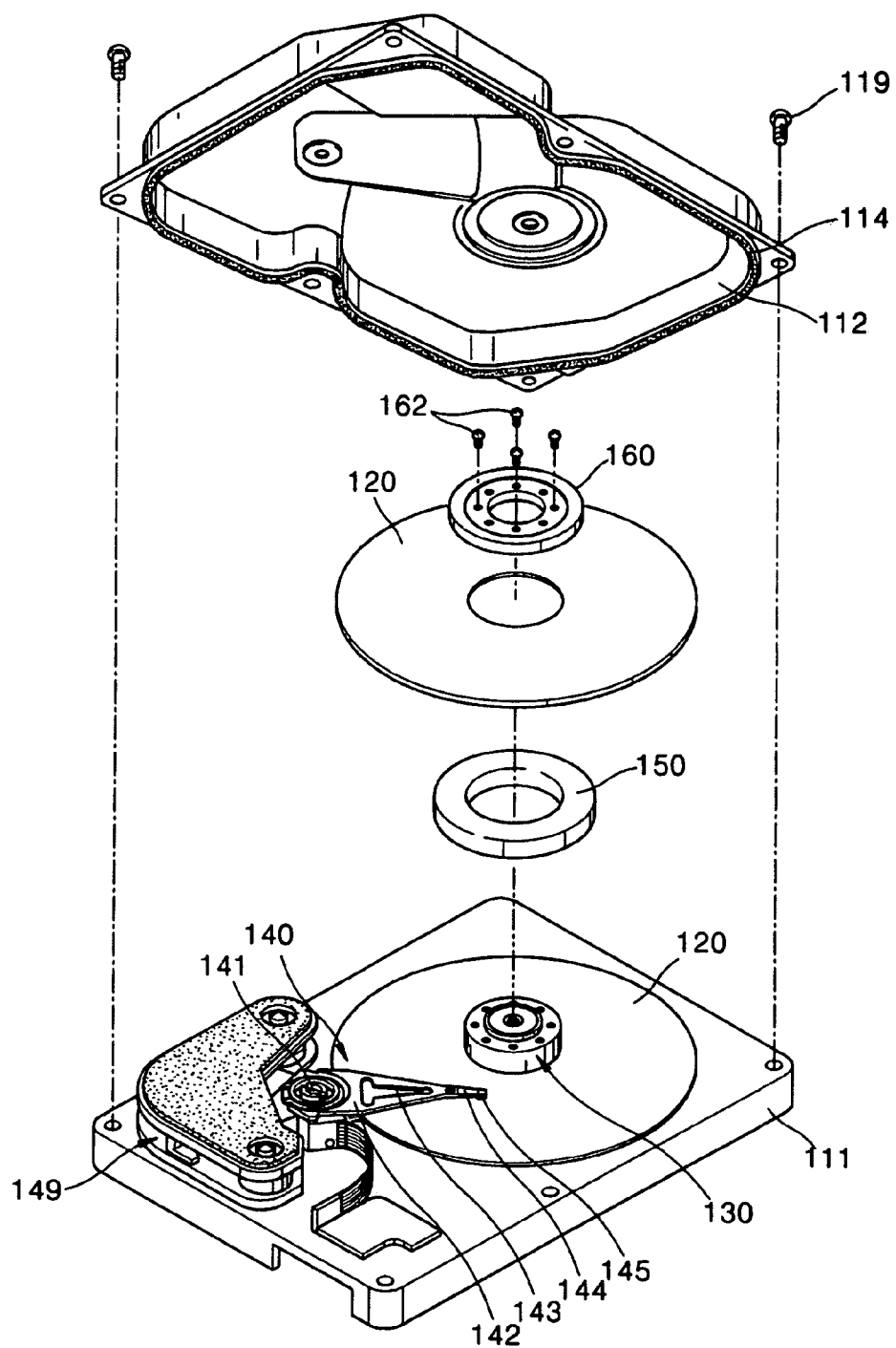
FIG. 2 is an exploded perspective view illustrating a hard disk drive including an actuator assembly according to an embodiment of the present invention.
Figure 3:
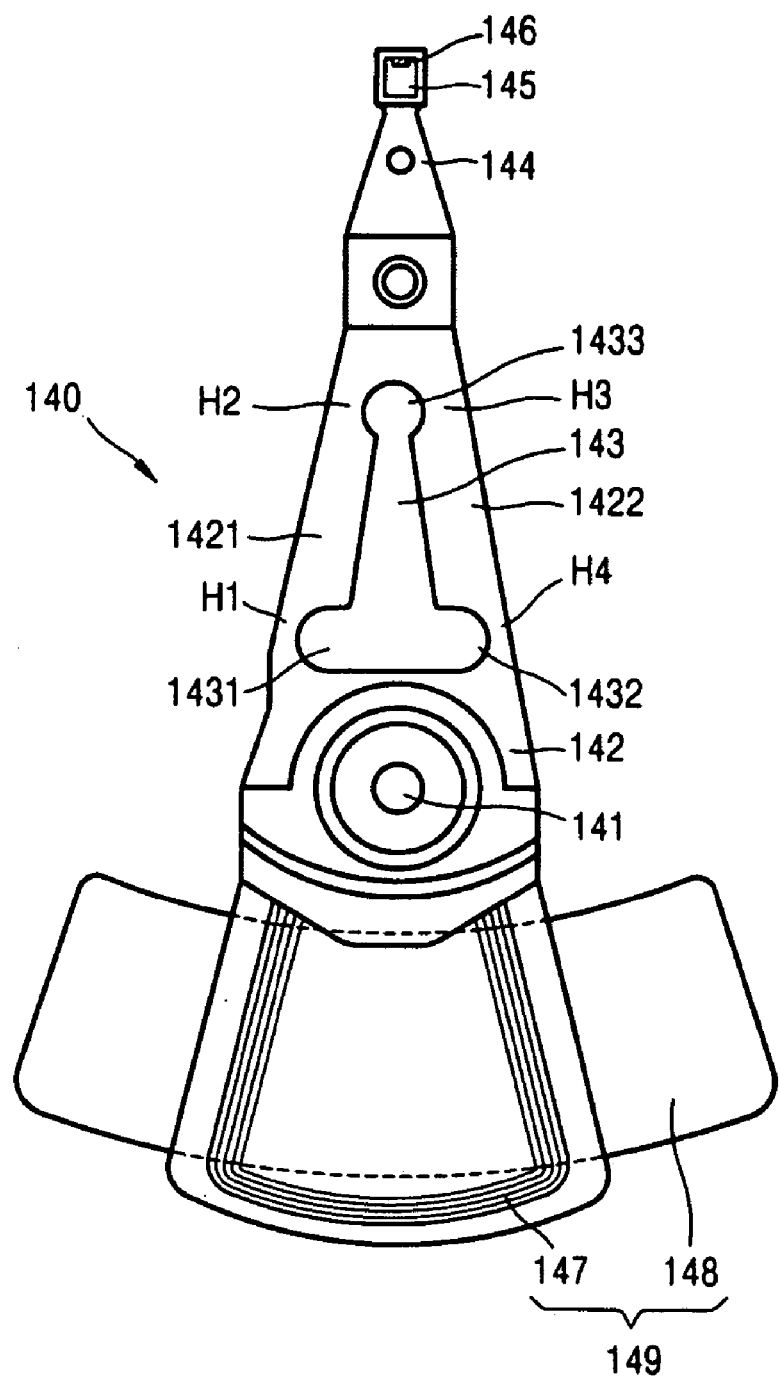
FIG. 3 is a plan view illustrating an actuator assembly according to an embodiment of the present invention shown in FIG. 2.

FIG. 2 is an exploded perspective view illustrating a hard disk drive including an actuator assembly according to an embodiment of the present invention. FIG. 3 is a plan view illustrating the actuator assembly according to an embodiment of the present invention shown in FIG. 2.

Referring to FIGS. 2 and 3, the hard disk drive includes a base member 111, a cover member 112, a disk 120, which is a data storage medium, a spindle motor 130 for spinning the disk 120, and an actuator assembly 140 for moving a read/write head 146 toward a desired position on the disk 120.

The spindle motor 130 and the actuator assembly 140 are installed on the base member 111. The cover member 112 is installed in an upper portion of the base member 111 by a plurality of cover fastening screws 119, so as to cover and protect the disk 120, the spindle motor 130, and the actuator assembly 140. A gasket 114 is interposed between the base member 111 and the cover member 112 to seal an interior of the hard disk drive.

The data storage disk 120 is coupled to the spindle motor 130. In the case of at least two disks 120, a disk spacer 150 is interposed between the disks 120 to maintain an interval therebetween. A disk clamp 160 is coupled to an upper end of the spindle motor 130 by a clamp fastening screw 162 to firmly secure the disk 120 to the spindle motor 130.

The actuator assembly 140 includes an actuator arm 142, a suspension 144, a slider 145 with a read/write head 146 mounted thereon, and a voice coil motor 149. The actuator arm 142 is rotatably coupled to a pivot shaft 141 installed to the base member 111. The suspension 144 is fixed to a front end of the actuator arm 142 for biasing a slider 145 with the read/write head 146 mounted thereon towards a surface of the disk 120. The voice coil motor 149 provides a driving force to rotate the actuator arm 142, and includes a voice coil 147 coupled to a rear end of the actuator arm 142 and a magnet 148 facing the voice coil 147.

The voice coil motor 149 is controlled by a servo control system to rotate the actuator arm 142 in a direction corresponding to Fleming's left-hand rule, due to the interaction of a magnetic field induced by the magnet 148 and a current applied to the voice coil 147. Specifically, when the hard disk drive is turned on and the disk 120 starts rotating, the voice coil motor 149 rotates the actuator arm 142 in one direction to move the read/write head 146 toward a data recording surface of the disk 120. In this state, the read/write head 146 follows a desired track provided on the data recording surface of the disk 120 to write or read the data. In contrast, when the hard disk drive is turned off and the disk 120 stops rotating, the voice coil motor 149 rotates the actuator arm 142 in a reverse direction to move the read/write head 146 off the data recording surface of the disk 120.

In the actuator assembly 140 according to the present invention, the actuator arm 142 employs a structure of a 4-bar linkage. To this end, the actuator arm 142 is formed with a desired shape of an opening 143 at a position between the front end of the actuator arm and the pivot shaft 141. The opening 143 has an approximately trapezoidal shape of which a width becomes gradually narrow toward the front end of the actuator arm 142. Rounded extension portions 1431, 1432, and 1433 are formed at corners of the opening 143 having the trapezoidal shape. Specifically, the first extension portion 1431 and the second extension portion 1432 are formed at two corners, which are adjacent to the pivot shaft 141, of the opening 143, respectively. A third rounded extension portion 1433 is formed at the other two corners, which are adjacent to the front end of the actuator arm 142, of the opening 143.

The actuator arm 142 has a structure of the 4-bar linkage, because of the above shape of the opening 143, which will be described hereinafter.

Figures 4A, 4B:
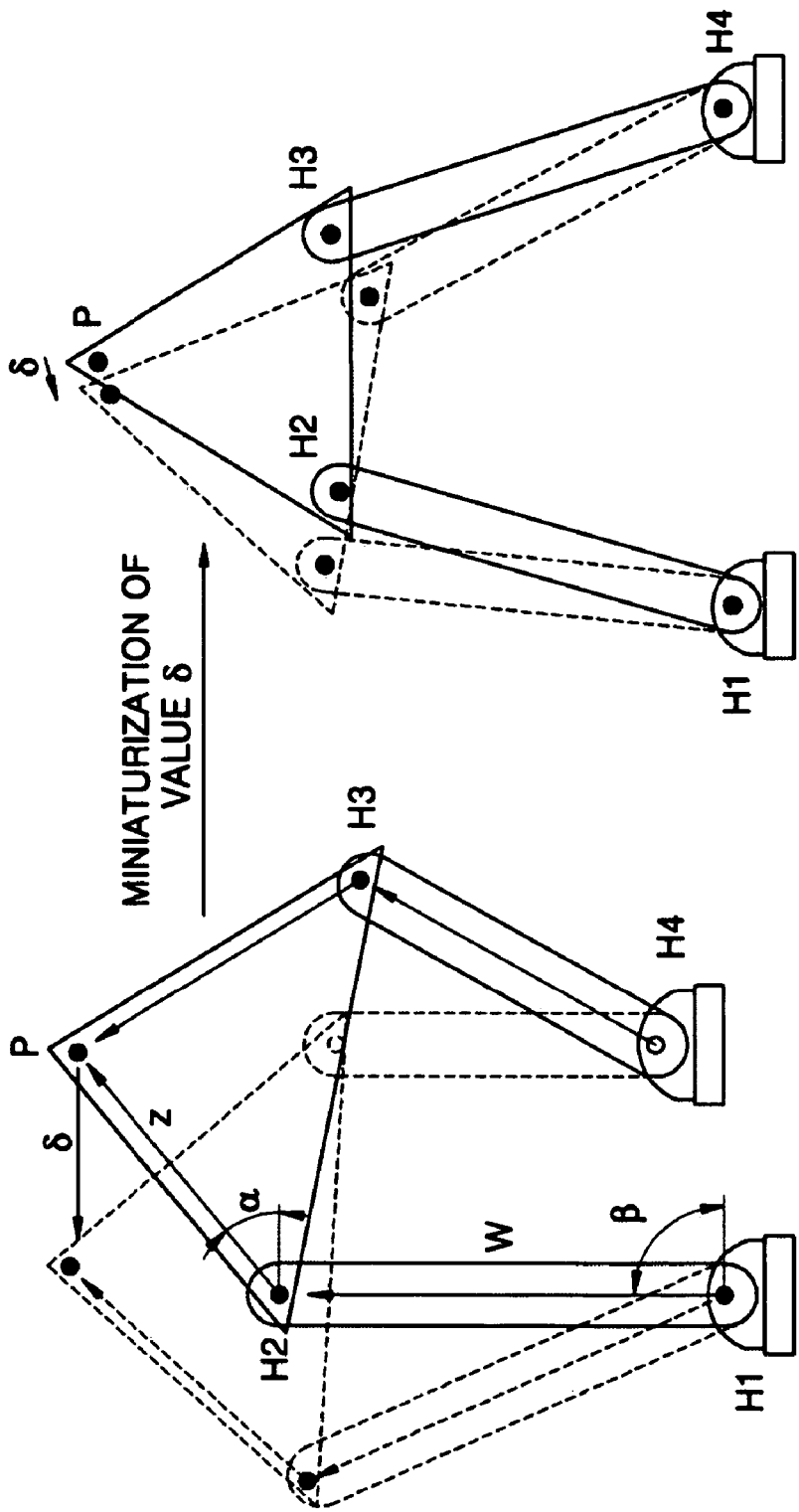
FIGS. 4A and 4B are views illustrating a structure of a 4-bar linkage used in an actuator arm of the actuator assembly according to an embodiment of the present invention.

FIGS. 4A and 4B are views illustrating a structure of the 4-bar linkage used in the actuator arm of the actuator assembly according to an embodiment of the present invention.

Referring to FIG. 4A, the structure of the 4-bar linkage includes four linkages $H_1$-$H_2$, $H_2$-$H_3$, $H_3$-$H_4$ and $H_4$-$H_1$ jointed to four hinges $H_1$, $H_2$, $H_3$ and $H_4$. One linkage $H_4$-$H_1$ is substantially a ground. In FIGS. 4A and 4B, W indicates a position vector determined by linkages $H_1$-$H_2$ and $H_3$-$H_4$, Z indicates a position vector of a point P at the hinge $H_2$, and α indicates an angle of the vector Z, and β indicates an angle of the vector W.

In the 4-bar linkage, a displacement δ of the point P is represented by the following Equation 1.

$$W(e^{i\beta}-1)+Z(e^{i\alpha}-1)=\delta \qquad \text{Equation 1}$$

According to Equation 1, when values α and β are changed within a certain range, the displacement δ of the point P can become 0 or be minimized by properly adjusting a length of each linkage, as shown in FIG. 4A.

Referring again to FIG. 3, the actuator arm 142 may be divided into left and right portions 1421 and 1422 on the basis of the opening 143. Both ends of the left and right portions 1421 and 1422 have a narrow width confined by the first, second and third expansion portions 1431, 1432 and 1433, thereby serving as hinges $H_1$, $H_2$, $H_3$ and $H_4$ of the 4-bar linkage.

Figure 5:
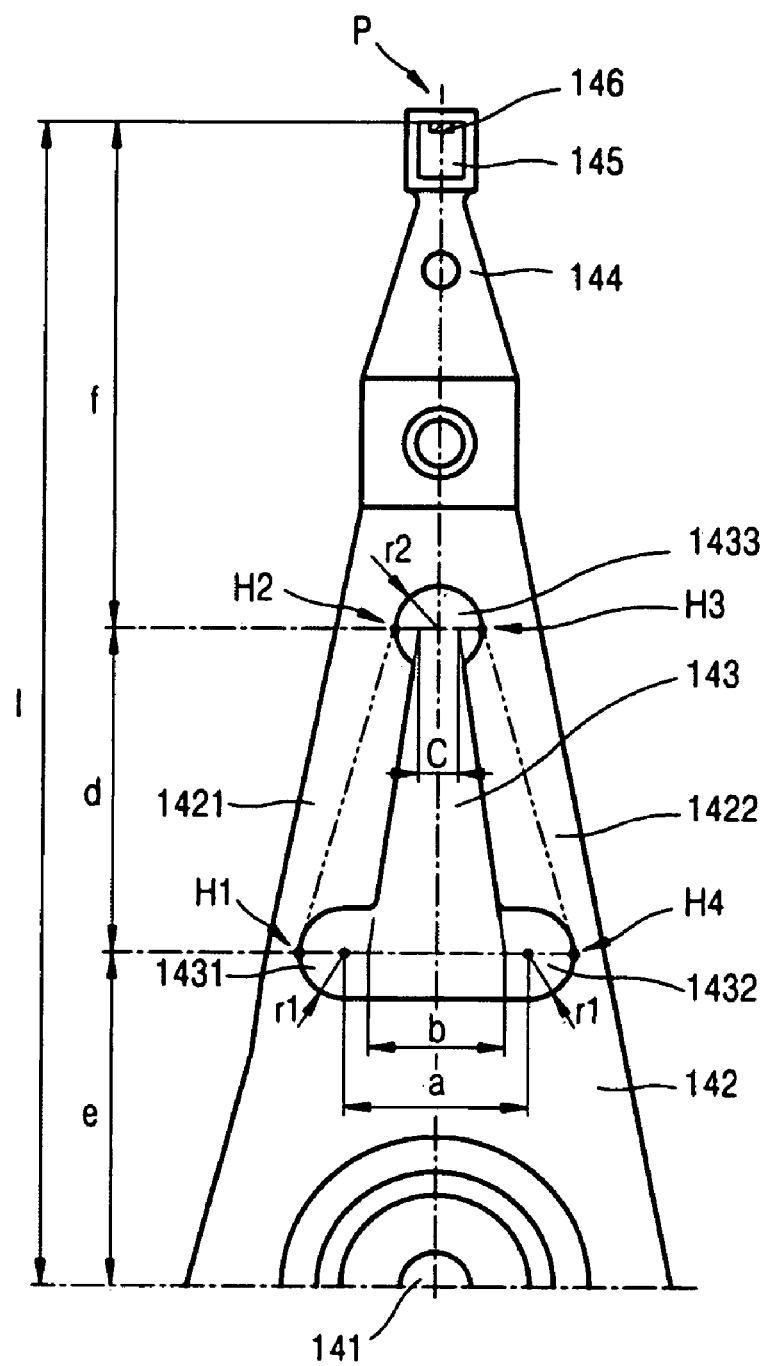
FIG. 5 is a view illustrating design factors for determining a shape of an opening formed in the actuator arm in FIG. 3.

FIG. 5 is a view illustrating design factors for determining a shape of the opening formed in the actuator arm in FIG. 3, and FIGS. 6A and 6B are views comparatively illustrating the design factors shown in FIG. 5 and the structure of the 4-bar linkage.

Referring to FIGS. 5, 6A and 6B, since the structure of the 4-bar linkage is achieved by the opening 143 formed in the actuator arm 142, it is necessary to properly determine the design factors determining the shape of the opening 143.

As shown in FIGS. 5, 6A and 6B, variables among the design factors are a, b, c, d, e, $r_1$ and $r_2$. Herein, "a" indicates a distance between each center of the first and second expansion portions 1431 and 1432 formed at the end of the opening 143 towards the pivot shaft 141, "b" indicates a length of a lower base of the opening 143, and "c" indicates a length of an upper base of the opening 143. Also, "d" indicates a vertical distance between the center of the first expansion portion 1431 formed at the end of the opening 143 towards the pivot shaft 141 and a center of the third expansion portion 1433 formed at the front end of the opening 143, and "e" indicates a vertical distance between the center of the first expansion portion 1431 formed at the end of the opening 143 towards the pivot shaft 141 and a center of the pivot shaft 141. Also, $r_1$ indicates a radius of the first and second expansion portions 1431 and 1432, and $r_2$ indicates a radius of the third expansion portion 1433 formed at the front end of the opening 143.

On the other hand, a design factor "f" indicates a vertical distance between the center of the third expansion portion 1433 formed at the front end of the opening 143 and the read/write head 146 represented by the point P, and a design factor "l" indicates a vertical distance between the center of the pivot shaft 141 and the read/write head 146, which are a constant determined depending upon a diameter of the disk 120.

Meanwhile, it is very complicated to determine the shape of the opening 143 using all of the seven variable design factors. Design factors significantly influencing the position error signal (PES) have been verified through the following process.

To this end, the present invention utilizes a statistical factorial design that is generally used. Table 1 lists maximum and minimum values for each of the seven design factors set in consideration of the whole size of the actuator arm 142 and experimental values obtained by the inventor.

TABLE 1

| | Design factor | | | | | | |
|---|---|---|---|---|---|---|---|
| | a | b | c | d | e | $r_1$ | $r_2$ |
| Min (−1), mm | 4.20 | 3.50 | 1.50 | 13.00 | 14.50 | 1.20 | 1.40 |
| Max (+1), mm | 5.10 | 4.50 | 2.50 | 14.50 | 16.00 | 1.80 | 1.70 |

If seven 2-level design factors are combined, the number of cases is $2^7$. Thus, there are too many cases. Therefore, the present invention utilizes a ⅛ fractional factorial design (FFD).

Table 2 lists 16 combinations of design factors according to the ⅛ fractional factorial design (FFD), and position error signals (PES) obtained experimentally for each case.

TABLE 2

| Case | a | b | c | d | e | $r_1$ | $r_2$ | PES |
|---|---|---|---|---|---|---|---|---|
| 1 | −1 | −1 | −1 | −1 | −1 | −1 | −1 | 16.7830 |
| 2 | 1 | −1 | −1 | −1 | 1 | −1 | 1 | 16.3069 |
| 3 | −1 | 1 | −1 | −1 | 1 | 1 | −1 | 16.4409 |
| 4 | 1 | 1 | −1 | −1 | −1 | 1 | 1 | 16.5129 |
| 5 | −1 | −1 | 1 | −1 | 1 | 1 | 1 | 16.6046 |
| 6 | 1 | −1 | 1 | −1 | −1 | 1 | −1 | 16.4196 |
| 7 | −1 | 1 | 1 | −1 | −1 | −1 | 1 | 16.7337 |
| 8 | 1 | 1 | 1 | −1 | 1 | −1 | −1 | 16.5034 |
| 9 | −1 | −1 | −1 | 1 | −1 | 1 | 1 | 16.4835 |
| 10 | 1 | −1 | −1 | 1 | 1 | 1 | −1 | 16.2002 |
| 11 | −1 | 1 | −1 | 1 | 1 | −1 | 1 | 16.6164 |
| 12 | 1 | 1 | −1 | 1 | −1 | −1 | −1 | 16.4230 |
| 13 | −1 | −1 | 1 | 1 | 1 | −1 | −1 | 16.5053 |
| 14 | 1 | −1 | 1 | 1 | −1 | −1 | 1 | 16.5943 |
| 15 | −1 | 1 | 1 | 1 | −1 | 1 | −1 | 16.6002 |
| 16 | 1 | 1 | 1 | 1 | 1 | 1 | 1 | 15.4951 |

Figure 1:
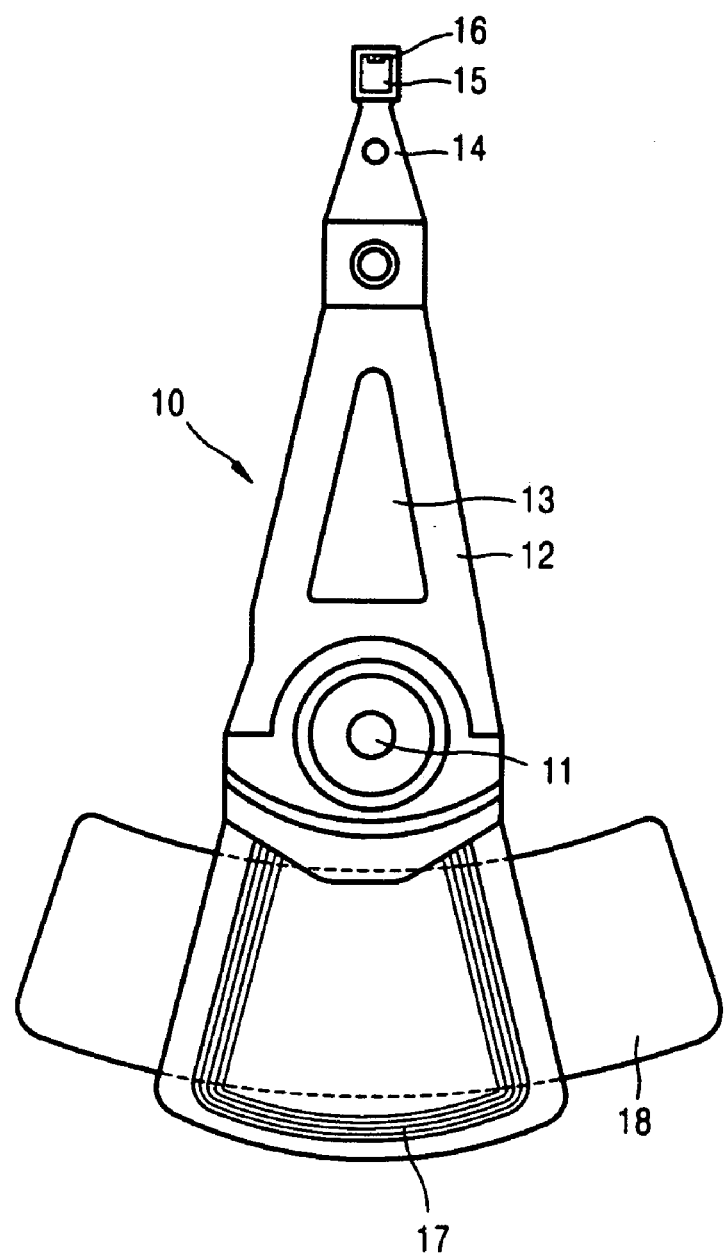
FIG. 1 is a plan view illustrating a conventional actuator assembly of a hard disk drive.

It would be appreciated from the results listed in Table 2 that the position error signal (PES) is within a range of about 15.4 to about 16.8 in the actuator assembly 140 having the actuator arm 142 according to the present invention. This is a very small value as the position error signal (PES) is about 17.4 in the conventional actuator assembly having the actuator arm shown in FIG. 1.

Figure 7A:
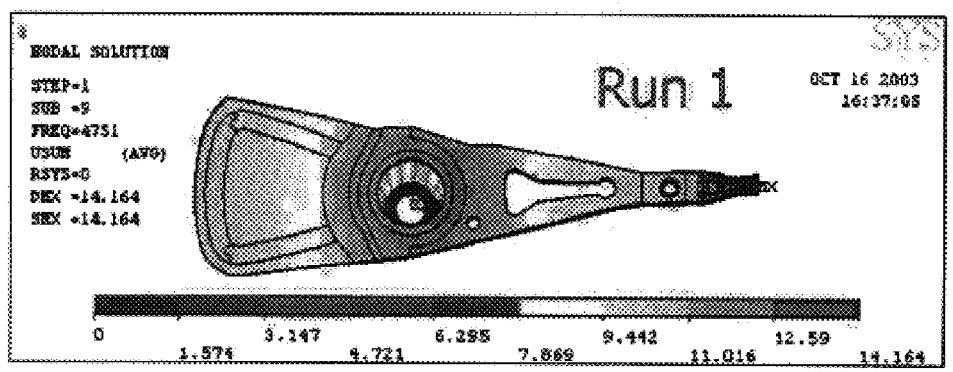
FIGS. 7A through 7D are views illustrating a vibration amplitude of a read/write head in a main resonance mode according to the shape of the opening formed in the actuator arm of FIG. 3.
Figure 7B:
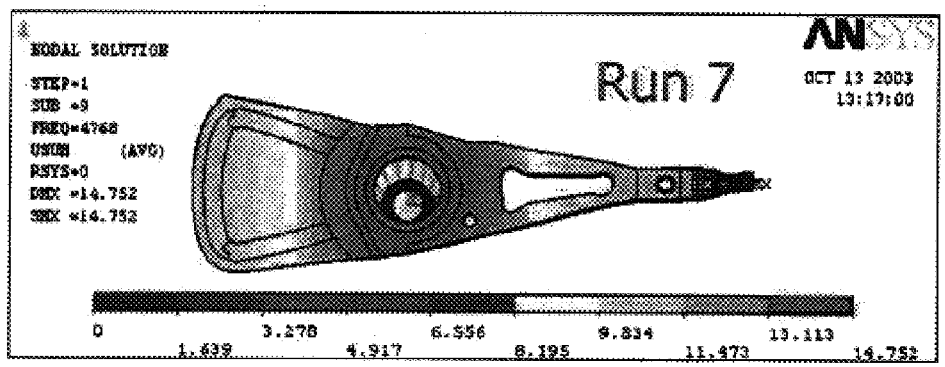
Figure 7C:
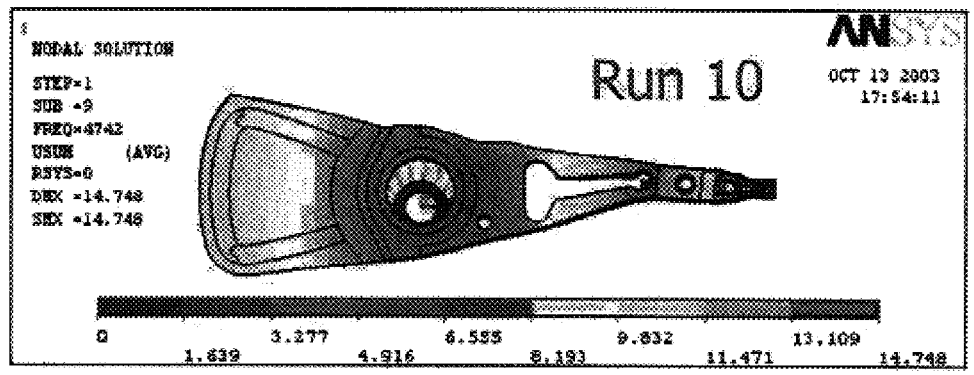
Figure 7D:
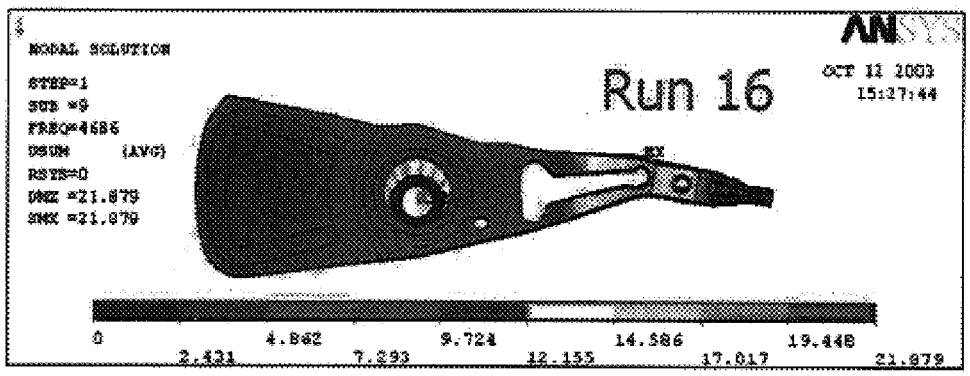

FIGS. 7A through 7D are views illustrating a vibration amplitude of the read/write head in the main resonance mode according to the shape of the opening formed in the actuator arm 142. FIGS. 7A and 7B show the vibration amplitude of the read/write head 146 in two cases (Nos. 1 and 7) when the position error signals among the 16 test results have the highest value. FIGS. 7C and 7D show the vibration amplitude of the read/write head 146 in two cases (Nos. 10 and 16) when the position error signals among the 16 test results have the lowest value.

It would be appreciated from FIGS. 7A through 7D that the displacement (i.e., the vibration amplitude) of the read/write head 146 varies in the main resonance mode with the shape of the opening 143 formed in the actuator arm 142. Specifically, it would be appreciated that the vibration amplitudes of the read/write head 146 in the test Nos. 10 and 16 shown in FIGS. 7C and 7D are lower than those of the tests Nos. 1 and 7 shown in FIGS. 7A and 7B.

As such, there is a difference between the vibration amplitudes of the read/write head 146 depending upon the shape of the opening 143 formed in the actuator arm 142 employing the 4-bar linkage. The displacement of the read/write head 146 is minimized by optimizing the design factors which determine the shape of the opening 143, thereby further decreasing the position error signal.

In order to find the design factors significantly influencing on the position error signal among the 7 design factors, P-values indicating a significance influence of each design factor are calculated through analysis of variance (ANOVA) based on the results listed in Table 2. The P-values are listed in Table 3.

TABLE 3

| | Design factor | | | | | | |
|---|---|---|---|---|---|---|---|
| | a | b | c | d | e | $r_1$ | $r_2$ |
| P | 0.031 | 0.537 | 0.735 | 0.156 | 0.067 | 0.090 | 0.568 |

In Table 3, the lower P-value, the higher the significance of the design factor. It would be appreciated from Table 3 that a, e and $r_1$ are the design factors significantly influencing the position error signal.

In order to optimize the shape of the opening 143, the inventor adopts the design factor $r_2$ influencing the shape of the opening 143, which also slightly influences the position error signal, in addition to the three design factors a, e and $r_1$.

Herein, l=f+d+e, in which l and f are a constant determined in an initial step. If the design factor d is determined, the design factor e is also determined. Therefore, the design factor e may be replaced with the design factor d.

The present invention provides the following equations to calculate the optimum values of four design factors a, d(e), $r_1$ and $r_2$.

Equation 1 is divided into real numbers and imaginary numbers to derive Equations 2 and 3.

$$W(\cos \beta - 1) + Z(\cos \alpha - 1) = \delta_x = 0 \quad \text{Equation 2}$$

$$W \sin \beta + Z \sin \alpha = \delta_y = 0 \quad \text{Equation 3}$$

Vectors W and Z in Equations 2 and 3 and angles α and β of the vectors can be represented as in Equations 4 through 7 using only the above four design factors a, d(e), $r_1$ and $r_2$. In Equations 4 and 5, f is a constant.

$$Z=\sqrt{r_2^2+f^2} \quad \text{Equation 4}$$

$$\alpha=\tan^{-1}(f/r_2) \quad \text{Equation 5}$$

$$W=\sqrt{(a/2+r_1-r_2)^2+d^2} \quad \text{Equation 6}$$

$$\beta=\tan^{-1}[d/(a/2+r_1-r_2)] \quad \text{Equation 7}$$

The design factors are calculated to satisfy the above equations. Specifically, it is possible to obtain the optimum value of each design factor, in which the displacement of the read/write head 146, i.e., the displacement of the point P is 0 or minimized, by substituting Equations 4 through 7 into Equations 2 and 3, respectively. At this time, it is possible to calculate the remaining two design factors from the equations by properly setting two design factors and substituting them into the equations.

The result of optimizing the four design factors in the hard disk drive having a diameter of 3.5 inches through this process is provided in Table 4.

TABLE 4

| | Design factor | | | | | |
|---|---|---|---|---|---|---|
| | a | e | $r_1$ | $r_2$ | b | c | d |
| Min (mm) | 4.7 | 15.50 | 1.50 | 1.50 | | | |
| Center (mm) | 5.0 | 16.00 | 1.70 | 1.65 | 4.50 | 2.00 | 14.00 |
| Max (mm) | 5.30 | 16.50 | 1.90 | 1.80 | | | |

From Table 4, after calculating the design factor d from the above equations, the design factor e is calculated using the relation e=1−f−d. The maximum value and minimum value of each of the design factors a, e, $r_1$ and $r_2$ take a proper margin into consideration. Meanwhile, the design factors b and c which slightly influences the position error signal are properly set by experience of a designer.

As described above, the actuator assembly 140 according to the present invention includes the actuator arm 142 having the structure of 4-bar linkage, and the actuator arm 142 is formed with the opening depending upon the optimum values of the design factors obtained from the equations. Therefore, the displacement of the read/write head 146 can be minimized in the main resonance mode. As such, the position error signal is reduced when the hard disk drive operates, thereby improving the characteristic and reliability of the read/write operation.

Meanwhile, better optimization values for the design factors listed in Table 4 can be obtained using a statistical response surface method (RSM) well known in the art.

In order to employ Box-Behnken 3-level RSM for optimizing the design factors, proper maximum and minimum values are applied to each of the design factors listed in Table 4. The position error signal and a first bending inherent vibration frequency B1 in the main resonance mode obtained in the test using concrete Box-Behnken design are listed in Table 5. In Table 5, "−1", "0" and "1" indicate a minimum value, a central value, and a maximum value, respectively.

TABLE 5

| Class | a | e | $r_1$ | $r_2$ | PES | B1(Hz) |
|---|---|---|---|---|---|---|
| 1 | −1 | −1 | 0 | 0 | 16.3 | 1697 |
| 2 | 1 | −1 | 0 | 0 | 16.1 | 1674 |
| 3 | −1 | 1 | 0 | 0 | 16.0 | 1710 |
| 4 | 1 | 1 | 0 | 0 | 15.8 | 1682 |

TABLE 5-continued

| Class | a | e | $r_1$ | $r_2$ | PES | B1(Hz) |
|---|---|---|---|---|---|---|
| 5 | 0 | 0 | −1 | −1 | 16.3 | 1708 |
| 6 | 0 | 0 | 1 | −1 | 16.2 | 1669 |
| 7 | 0 | 0 | −1 | 1 | 16.1 | 1712 |
| 8 | 0 | 0 | 1 | 1 | 15.6 | 1673 |
| 9 | −1 | 0 | −1 | 0 | 16.4 | 1722 |
| 10 | 1 | 0 | −1 | 0 | 16.3 | 1701 |
| 11 | −1 | 0 | 1 | 0 | 16.2 | 1684 |
| 12 | 1 | 0 | 1 | 0 | 16.1 | 1645 |
| 13 | 0 | −1 | 0 | −1 | 16.4 | 1696 |
| 14 | 0 | 1 | 0 | −1 | 16.1 | 1693 |
| 15 | 0 | −1 | 0 | 1 | 16.0 | 1691 |
| 16 | 0 | 1 | 0 | 1 | 15.6 | 1698 |
| 17 | −1 | 0 | 0 | −1 | 16.3 | 1701 |
| 18 | 1 | 0 | 0 | −1 | 16.2 | 1676 |
| 19 | −1 | 0 | 0 | 1 | 16.0 | 1705 |
| 20 | 1 | 0 | 0 | 1 | 15.7 | 1680 |
| 21 | 0 | −1 | −1 | 0 | 16.4 | 1709 |
| 22 | 0 | 1 | −1 | 0 | 16.1 | 1720 |
| 23 | 0 | −1 | 1 | 0 | 16.2 | 1667 |
| 24 | 0 | 1 | 1 | 0 | 15.8 | 1676 |
| 25 | 0 | 0 | 0 | 0 | 16.2 | 1692 |

By use of the results listed in Table 5, Equations 8 and 9 concerning the position error signal and the first bending inherent vibration frequency B1 can be obtained through a response surface regression.

$$PES = -141.87 + 5.01a + 14.18e + 8.05r_1 + 36.59r_2 - \\ 0.25a^2 - 0.40e^2 - 0.16r_1^2 - 5.45r_2^2 - 0.05ac - \\ 0.02ar_1 - 1.19ar_2 - 0.23er_1 - 0.60er_2 - 2.66r_1r_2 \quad \text{Equation 8}$$

$$B1 = 2608.78 + 503.15a - 242.67e + \\ 471.46r_1 - 603.89r_2 - 28.71a^2 + 7.67e^2 - \\ 36.46r_1^2 + 24.07r_2^2 - 8.33ac - 75.00ar_1 + \\ 5.21E^{-14}ar_2 - 5.00er_1 + 33.33er_2 + 9.53E^{-14}r_1r_2 \quad \text{Equation 9}$$

It would be appreciated from Equations 8 and 9 that if the optimum values for the design factors are determined, the position error signal and the first bending inherent vibration frequency B1 can be sufficiently predicted.

Meanwhile, the first bending inherent vibration frequency B1 varies according to the optimized design factors. The first bending inherent vibration frequency B1 of the actuator assembly is a decisive factor for the impact performance of the hard disk drive, which is a limit condition for optimizing the design factors to reduce the position error signal. In other words, it is necessary to take the impact performance into consideration when optimizing the design factors in order to reduce the position error signal.

Figure 8:
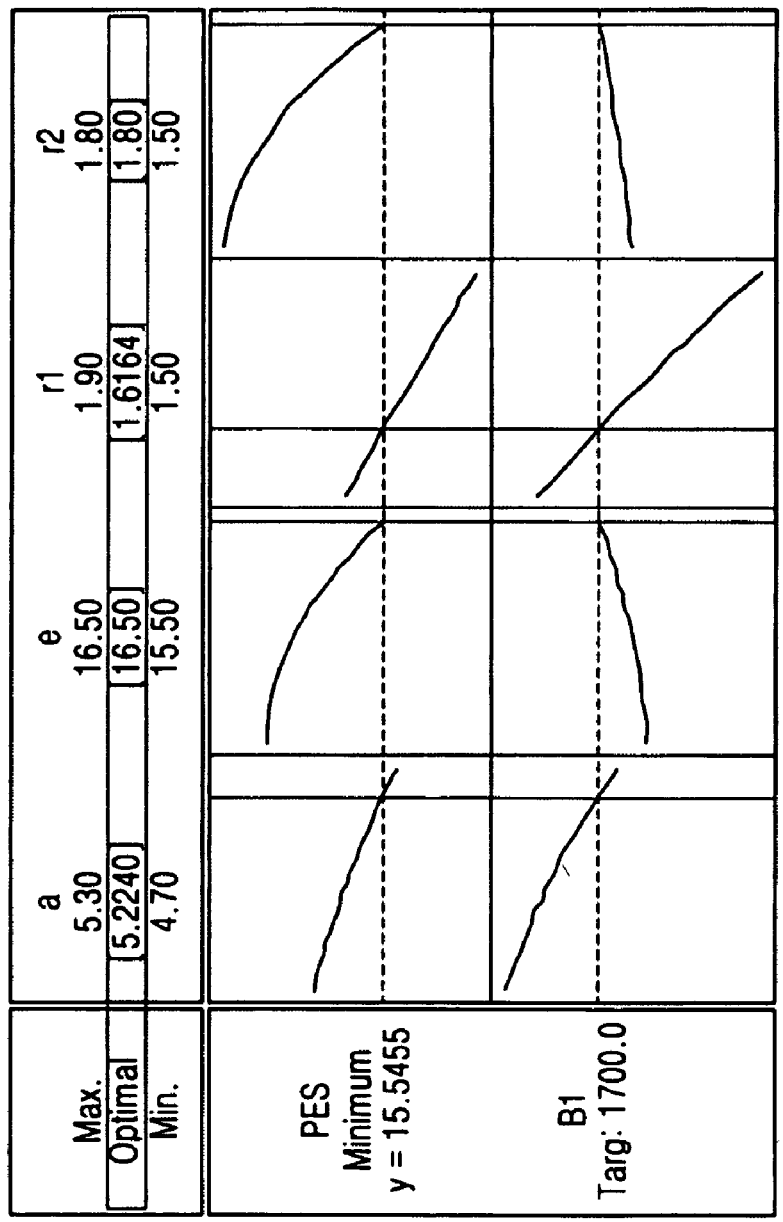
FIG. 8 is a view illustrating a minitab response optimizer for optimizing the design factors.

FIG. 8 is a view illustrating a minitab response optimizer for optimizing the design factors.

As shown in FIG. 8, if the minitab response optimizer is utilized, when the first bending inherent vibration frequency B1 is set to 1700 Hz, which is a value known to result in a good impact characteristic, the optimum values of the design factors to minimize the position error signal can be obtained.

The optimum values of the design factors thus obtained are listed in Table 6. In this case, the position error signal is about 15.5, and the first bending inherent vibration frequency B1 is about 1700 Hz.

TABLE 6

| Design factor | Optimum value (mm) | Machining tolerance (mm) |
|---|---|---|
| a | 5.224 | ±0.1 |
| e | 16.500 | ±0.1 |
| $r_1$ | 1.616 | ±0.1 |
| $r_2$ | 1.800 | ±0.1 |

Figure 9:
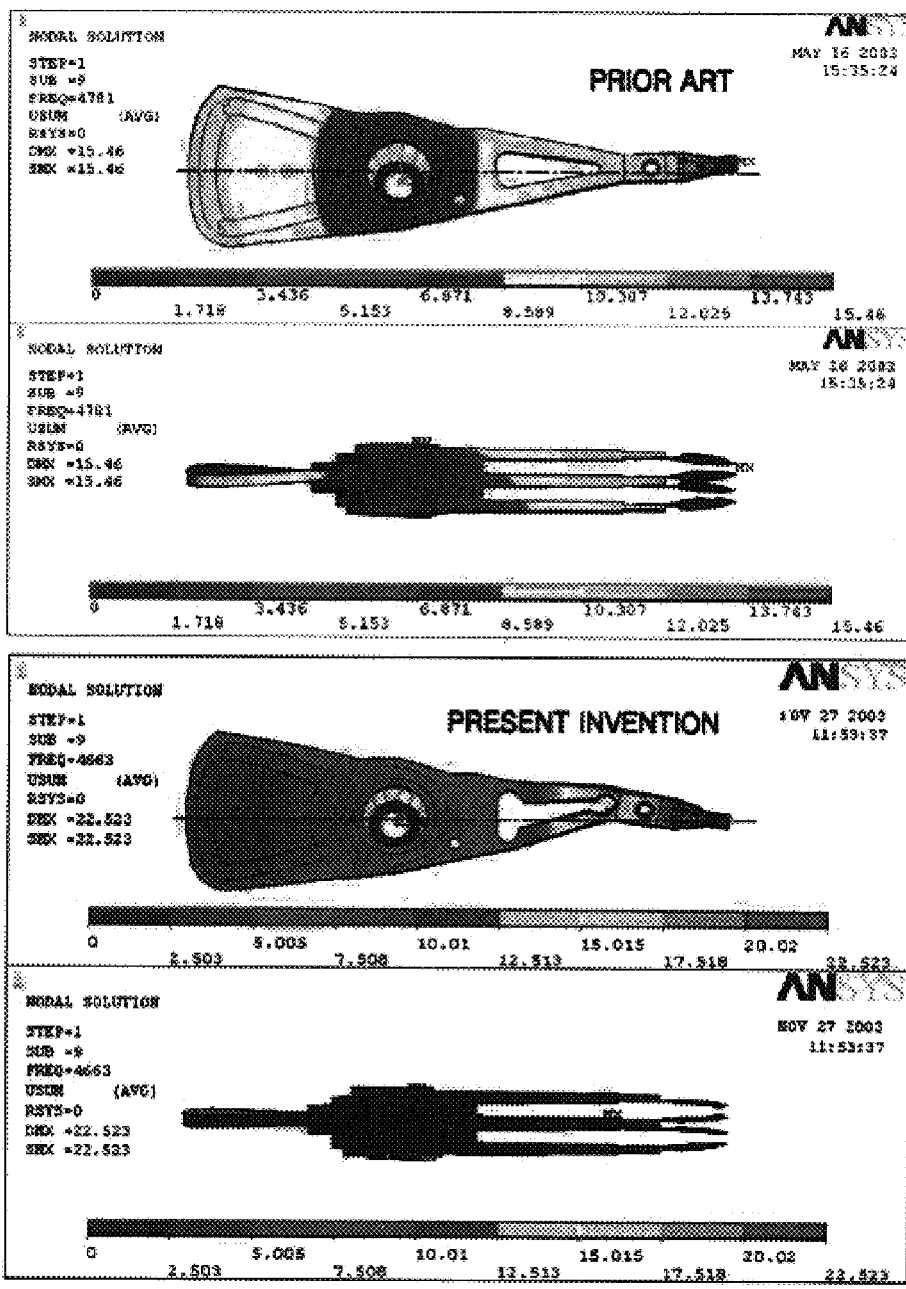
FIG. 9 is a view for comparing a displacement of a read/write head of an actuator assembly according to the present invention in a main resonance mode and that of a conventional read/write head.

FIG. 9 is a view comparatively illustrating the displacement of the read/write head of the actuator assembly according to the present invention in the main resonance mode and that of a conventional read/write head.

According to FIG. 9, when the actuator arm includes the structure of the 4-bar linkage of the present invention, the displacement of the read/write head is remarkably reduced compared with that of the conventional read/write head.

Figure 10:
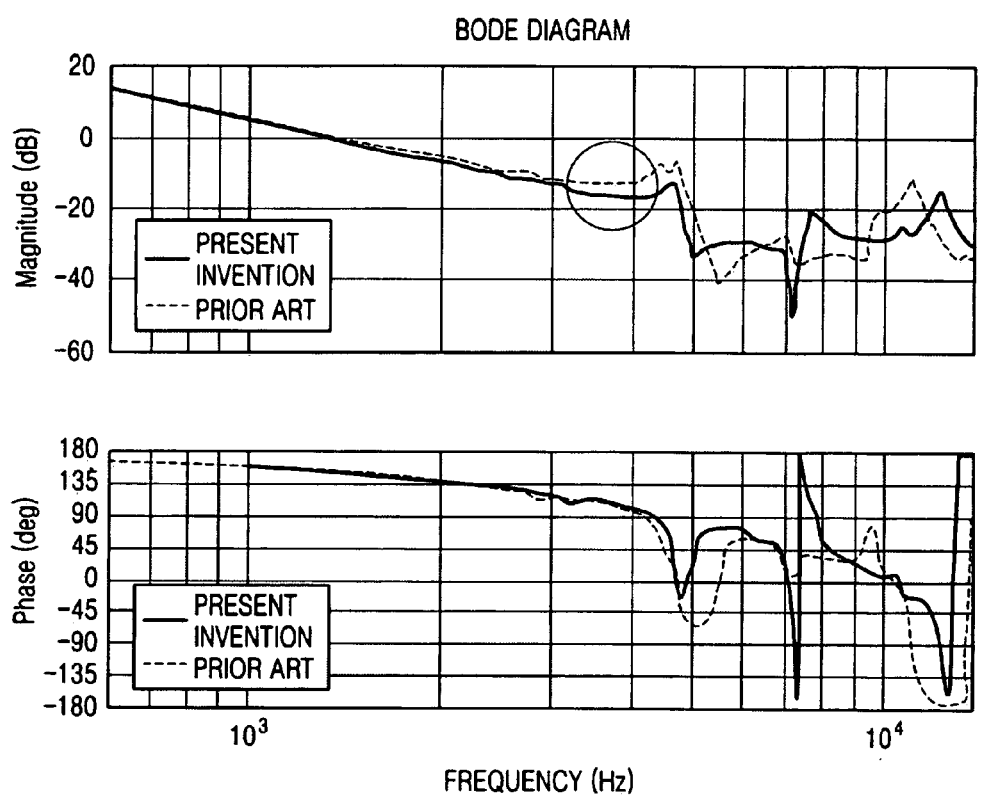
FIG. 10 is a Bode diagram of an actuator assembly according to the present invention and that of a conventional actuator assembly.

FIG. 10 is a Bode diagram of the actuator assembly according to the present invention and a conventional actuator assembly.

It is apparent from FIG. 10 that a gain reduction of about 4 kHz is obtained for the actuator assembly according to the present invention, compared with the conventional actuator assembly.

Figure 11A:
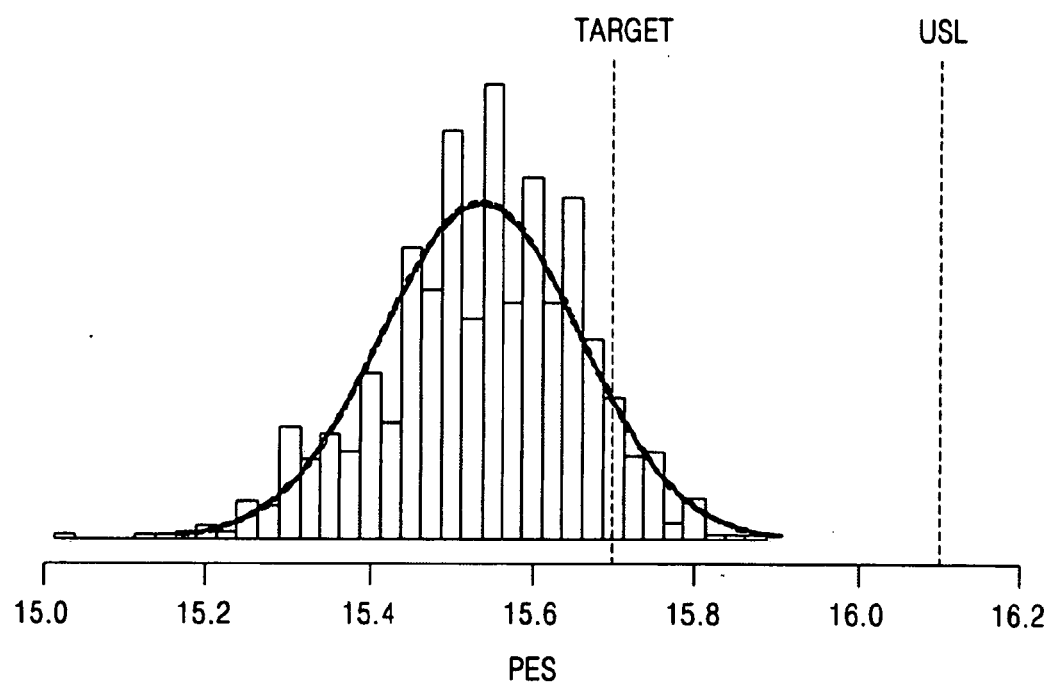
FIGS. 11A and 11B are graphs illustrating results obtained by analyzing the possibility of mass-producing an actuator assembly according to the present invention.
Figure 11B:
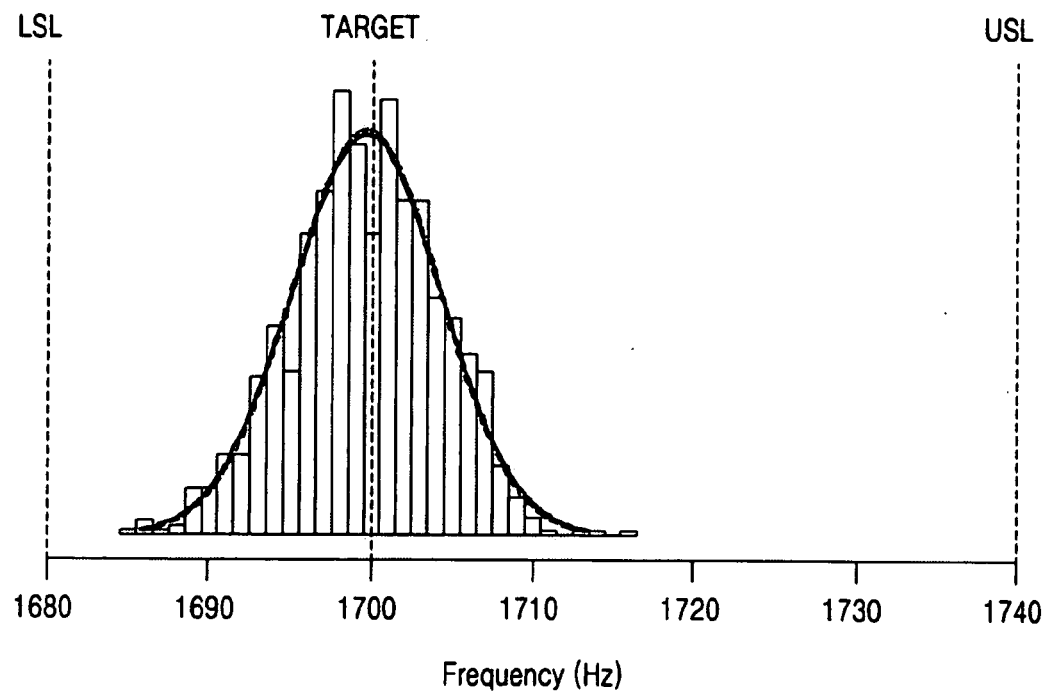

FIGS. 11A and 11B are graphs illustrating results obtained by analyzing the possibility of mass-producing the actuator assembly according to the present invention.

Since the actuator arm of the actuator assembly according to the present invention is made of metal, for example, aluminum, the optimum values of the design factors vary with a machining tolerance. Thus, the position error signal and the first bending inherent vibration frequency B1 also vary. Herein, the machining tolerance is about ±0.1 mm shown in Table 6.

In order to verify the possibility of mass-producing the actuator assembly according to the present invention, the position error signal and the first bending inherent vibration frequency B1 are calculated by randomly varying the optimum values of the design factors according to the machining tolerance based on Equations 8 and 9. These results are shown in FIGS. 11A and 11B.

Referring to FIGS. 11A and 11B, when the actuator arm according to the present invention is manufactured with a reasonable machining tolerance, the position error signal and the first bending inherent vibration frequency B1 are distributed between an upper spec limit (USL) and a lower spec limit (LSL), thereby maintaining desired characteristics. The distribution of the position error signal is 6.09σ, and the distribution of the first bending inherent vibration frequency B1 is 5.79σ. Thus, the possibility of mass-producing the actuator assembly according to the present invention is confirmed.

With the above description, since the actuator assembly according to the present invention includes the actuator arm having the structure of an optimized 4-bar linkage, the displacement of the read/write head in the main resonance frequency mode can be minimized. As such, when the hard disk drive operates, the position error signal is reduced, and the reliability of the read/write characteristic is improved.

In addition, the actuator arm according to the present invention can be mass-produced with a reasonable machining tolerance.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An actuator assembly for a hard disk drive, comprising:
a slider with a read/write head mounted thereon;
a suspension supporting the slider;
an actuator arm rotatably coupled to a pivot shaft, in which the suspension is fixed to a front end of the actuator arm; and
a voice coil motor rotates the actuator arm,
wherein: the actuator arm includes a structure of a 4-bar linkage defined by an opening formed between the front end of the actuator arm and the pivot shaft;
the opening has an approximately trapezoidal shape, in which a first rounded extension portion and a second rounded extension portion are formed at two corners adjacent to the pivot shaft of the opening, respectively, and a third rounded extension portion is formed at two corners adjacent to a front end of the opening, and hinges $H_1$, $H_2$, $H_3$ and $H_4$ are formed at the actuator arm by the first, second and third extension portions;
a position vector corresponding to linkage $H_1$-$H_2$ connecting two hinges $H_1$ and $H_2$ formed at one side of the opening is W, a position vector of the read/write head at the hinge $H_2$ is Z, an angle of the vector Z is α, an angle of the vector W is β, and displacement of the head/write head of the actuator assembly in a main resonance mode is δ,
design factors determining a shape of the opening are optimized to meet the following relations for the structure of 4-bar linkage:

$$W(\cos \beta - 1) + Z(\cos \alpha - 1) = \delta_x = 0$$

$$W \sin \beta + Z \sin \alpha = \delta_y = 0.$$

2. The actuator assembly according to claim 1, wherein the position vectors W and Z and the angles β and α corresponding to the position vectors are obtained from the following relations for one constant and four variables among the design factors of the opening, in which the four variables includes a distance α between each center of the first and second expansion portions, a vertical distance d between the center of the first expansion portion and a center of the third expansion portion, a radius $r_1$ of the first and second expansion portions, and a radius $r_2$ of the third expansion portion, and the constant is a vertical distance f between the center of the third expansion portion and the read/write head:

$$Z = \sqrt{r_2^2 + f^2}$$

$$\alpha = \tan^{-1}(f/r_2)$$

$$W = \sqrt{(a/2 + r_1 - r_2)^2 + d^2}$$

$$\beta = \tan^{-1}[d/(a/2 + r_1 - r_2)].$$

3. A hard disk drive comprising:
a base member and a cover member;
a spindle motor installed on the base member;
a disk mounted on the spindle motor for storing data; and
an actuator assembly according to claim 1 for moving a read/write head toward a desired position on the disk.

4. A method for optimizing a shape of an opening to be formed in an actuator arm of a hard disk drive including a structure of a 4-bar linkage, comprising:
selecting design factors significantly influencing on a position error signal among the design factors determining a shape of the opening, in which the opening is formed between a front end of the actuator arm and a pivot shaft in an approximately trapezoidal shape, in which a first rounded extension portion and a second rounded extension portion are formed at two corners adjacent to the pivot shaft of the opening, respectively, and a third rounded extension portion is formed at two corners adjacent to a front end of the opening, and in which hinges $H_1$, $H_2$, $H_3$ and $H_4$ are formed at the actuator arm by the first, second and third extension portions;

deriving relations for position vectors W and Z and angles $\beta$ and $\alpha$ corresponding to the position vectors using the selected design factors, in which W is a position vector corresponding to linkage $H_1$-$H_2$ connecting two hinges $H_1$ and $H_2$ formed at one side of the opening is W, Z is a position vector of the read/write head at the hinge $H_2$, $\alpha$ is an angle of the vector $Z\alpha$, $\beta$ is an angle of the vector W is $\beta$, and $\delta$ is displacement of the head/write head of the actuator assembly in a main resonance mode; and obtaining an optimum value of the design factors using the derived relations and following relations for the structure of the 4-bar linkage:

$$W(\cos \beta - 1) + Z(\cos \alpha - 1) = \delta_x = 0$$

$$W \sin \beta + Z \sin \alpha = \delta_y = 0.$$

5. The method according to claim 4, wherein the design factor selecting operation comprises:

designing the design factors using a factorial design (FD) of a 2-level design, and obtaining data for the position error signal; and calculating a P-value indicating a significance of each design factor based on the data for the position error signal through an analysis of variance (ANOVA), and selecting the design factors of high significance according to the calculated P-value.

6. The method according to claim 5, wherein the factorial design (FD) is a ⅛ fractional factorial design (FFD).

7. The method according to claim 4, wherein the selected design factors include four variables and one constant, in which the variables are a distance $a$ between each center of the first and second expansion portions, a vertical distance d between the center of the first expansion portion and a center of the third expansion portion, a radius $r_1$ of the first and second expansion portions, and a radius $r_2$ of the third expansion portion, and the constant is a vertical distance f between the center of the third expansion portion and the read/write head.

8. The method according to claim 7, wherein the position vectors W and Z and the angles $\beta$ and $\alpha$ corresponding to the position vectors are obtained from the following relations represented as the one constant and the four variables:

$$Z = \sqrt{r_2^2 + f^2}$$

$$\alpha = \tan^{-1}(f/r_2)$$

$$W = \sqrt{(a/2 + r_1 - r_2)^2 + d^2}$$

$$\beta = \tan^{-1}[d/(a/2 + r_1 - r_2)].$$

9. The method according to claim 4, further comprising secondary optimizing the design factors through a statistical method using the optimum values of the design factors as initial values.

10. The method according to claim 9, wherein the secondary optimizing of the design factors through statistical method comprises:

deriving equations for the position error signal and a first bending inherent vibration frequency in a main resonance mode based on the initial values of the design factors using a response surface method (RSM); and when the first bending inherent vibration frequency is set at a constant level, obtaining optimum values of the design factors to minimize the position error signal by using a response optimizer.

11. The method according to claim 10, wherein a Box-Behnken 3-level design is utilized in the RSM.

12. A hard disk drive comprising:

a base member and a cover member;

a spindle motor installed on the base member;

a disk mounted on the spindle motor for storing data; and an actuator assembly according to claim 2 for moving a read/write head toward a desired position on the disk.

* * * * *